United States Patent
Riza

(10) Patent No.: US 6,525,863 B1
(45) Date of Patent: Feb. 25, 2003

(54) MULTI-TECHNOLOGY MULTI-BEAM-FORMER PLATFORM FOR ROBUST FIBER-OPTICAL BEAM CONTROL MODULES

(75) Inventor: Nabeel A. Riza, Orlando, FL (US)

(73) Assignee: Nuonics, Inc., Orlando, FL (US)

( * ) Notice: Subject to any disclaimer, the term of this patent is extended or adjusted under 35 U.S.C. 154(b) by 0 days.

(21) Appl. No.: 09/512,436

(22) Filed: Feb. 25, 2000

(51) Int. Cl.[7] .............................................. G02B 26/00

(52) U.S. Cl. ...................... 359/290; 359/291; 359/292; 359/299; 359/238

(58) Field of Search ................................ 359/290, 291, 359/292, 295, 298, 299, 238, 245, 259, 267

(56) References Cited

U.S. PATENT DOCUMENTS

| | | | |
|---|---|---|---|
| 4,626,066 A | | 12/1986 | Levinson ...................... 385/22 |
| 4,819,084 A | * | 4/1989 | Bark ........................... 358/296 |
| 5,729,386 A | * | 3/1998 | Hwang ........................ 359/618 |
| 5,774,604 A | | 6/1998 | McDonald .................... 385/18 |
| 5,915,063 A | | 6/1999 | Colbourne et al. ......... 385/140 |

OTHER PUBLICATIONS

Shifu Yuan and Nabeel A. Riza, General formula for coupling–loss characterization of single–mode fiber collimators by use of gradient–index rod lenses; Applied Optics/vol. 38, No. 15, May 20, 1999.

Nabeel A. Riza, Reconfigurable Optical Wireless, IEEE Lasers and Electro–Optics Society, vol. 1, Nov. 8–9, 1999, pp. 70–71.

Nabeel A. Riza and Sarun Sumriddetchkajorn, Digitally controlled fault–tolerant multiwavelength programmable fiber–optic attenuator using a two–dimensional digital micromirror device. Optics Letters/vol. 24, No. 5/Mar. 1, 1999, pp. 282–284.

Nabeel A. Riza and Sarun Sumriddetchkajorn, Multiwavelength Three Dimensional 2×2 Fiber–Optic Switch Structure Using Small Tilt Micro–Mirrors,SPIE, vol. 3749, pp. 470–471, Aug. 1999.

Joseph E. Ford and James A. Walker, Dynamic Spectral Power Equalization Using Micro–Opto–Mechanics, IEE Photonics Technology Letters, vol. 10, No. 10, Oct., 1998, pp. 1440–1442.

Laor, Fontenot, Richards, D'Entremont, Hudson, Krozier, Performance of a 576×576 Optical Cross Connect, National Fiber Optic Engineers Conference, Sep. 26–30, 1999, pp. 276–281.

(List continued on next page.)

*Primary Examiner*—Georgia Epps
*Assistant Examiner*—Tim Thompson
(74) *Attorney, Agent, or Firm*—James H. Beusse; Beusse Brownlee Bowdoin & Wolter, P.A.

(57) ABSTRACT

This invention pertains to a basic multi-technology application of cascaded beam-formers. A dual MEMS-EO technology platform method involving a two axis deflection micromirror cascaded with a three dimensional electro-optical beam-former such as a multi pixel liquid crystal device forms a powerful reflective control site for an incident beam, thereby inherently providing a robust beam control with both coarse and fine beam control capabilities in three dimensions. The electrically controlled two axis micromirror is excellent in providing the large angular beam deflections, while the liquid crystal device provides excellent small-beam deflections. This leads to a mechanically robust beam control module. A multipixel MEMS mirror device option coupled with the EO device can also provide simultaneous multi-beam generation capability. Furthermore, use of macro-pixels for both the MEMS and EO devices provides resistance to single pixel dependent catastrophic failure for the overall module. The mirror two-axis control can be supplemented with additional translational mirror motion, giving the ultimate option of cascading two 3-D beam-formers.

5 Claims, 4 Drawing Sheets

OTHER PUBLICATIONS

L.Y. Lin, E.L. Goldstein, R.W. Tkach, Free–Space Micromachined Optical Switches With Submillisecond Switching Time For Large–Scale Optical Crossconnects, IEEE Photonics Technology Lettes, vol. 10, No. 4, Apr., 1998, pp. 525–527.

Gordon D. Love, Liquid–crystal phase modulator for unpolarized light, Applied Optics/vol. 32. No. 13, May 1, 1993, pp. 2222–2223.

Nabeel A. Riza and Nicholas Madamopoulos, Synchronous amplitude and time control for an optimum dynamic range variable photonic delay line, Applied Optics/vol. 38, No. 11, Apr. 10, 1999, pp. 2309–2318.

Nabeel A. Riza and Shifu Yuan, Robust packaging of photonic RF modules using ultra–thin adaptive optical interconnect devices, SPIE, vol. 3160, pp. 170–177. (1997).

Nabeel A. Riza, Shifu Yuan, Demonstration of a liquid–crystal adaptive alignment tweeker for high–speed infrared band fiber–fed free–space systems, Optical Engineering, vol. 37, No. 6, Jun. 1998, pp. 1876–1880.

Johnson, Loebel, Gitlin, Paradise, Two–axis Micromirror Scanner, SPIE, vol. 3787, pp. 88–95. Jul. 1999.

Nabeel A. Riza, Sarun Sumriddetchkajorn, Versatile multi–wavelength fiber–optic switch and attenuator structures using mirror manipulations, Optics Communications 169 (1999) 233–244.

* cited by examiner ies to a basic multi-technology application of cascaded optical beam-formers or beam spoilers and, more particularly, to the use of such beam-formers in fiber-optic (FO) attenuators and switch modules using a micro-electromechanical systems MEMS-EO beam-former approach to three dimensional (3-D) beam control. In one embodiment, the invention uses the physical cascading of two 3-D beam-formers, namely, an electronically controlled optical MEMS two axis micro-mirror with optional z-axis translational control coupled with an electronically controlled EO liquid crystal device 3-D beam-former to form a robust single beam attenuation and routing module. These dual 3-D beam-former based high speed, robust, fault-tolerant FO structures can be used for routing and attenuating multiple light signals in optical networks such as wavelength division multiplexed (WDM) optical communications, distributed sensor networks, and photonic signal processing systems and can also be deployed in free-space optical applications such as laser communications, metrology instrumentation, and optical read/write data systems.

BACKGROUND OF INVENTION

The programmable 3-D optical beam-former scanner module is a basic building block for many optical applications as it can be used to accomplish routing in fiber communications networks, photonic signal processing, distributed optical sensing, and optical controls. This 3-D scanner module can also be used to form variable optical attenuators used in building blocks for several key optical systems such as attenuators required as equalizers in wavelength division multiplexed (WDM) fiber-optic (FO) communication systems using non-uniform gain optical amplifiers. Other important applications include polarization dependent loss compensation in fiber optic networks, optical component testing, wavelength tunable receivers, and optical detector protection.

The desired features for such a 3-D beam-forming module include wide angle scans with fine angular controls, focus/defocus capability, polarization independence, low optical loss (e.g.,<1 dB), low inter-beam crosstalk (<−30 dB), multiple simultaneous beams generation, robustness to catastrophic failure, low electrical power consumption, and simple to align low cost designs for large scale commercial production and deployment. Depending on the application, 3-D beam-former module switching speeds can range from nanoseconds to several milliseconds.

For centuries, an excellent choice for light scan control has been the use of mirrors. Mirrors provide high reflectivity over broad bandwidths, as desired in WDM systems. Today, an excellent method for making actively controlled mirrors is via micro-electromechanical system (MEMS) technology that promises to offer low cost compact optical modules via the use of low cost batch fabrication techniques similar to semiconductor electronic chip production methods. Optical MEMS technology using micro-mirrors has been previously proposed to realize fiber optic beam control modules to form attenuators and switches. In these cases, a micro-mirror acts to deflect or obstruct a single light beam in one or two dimensions, thus routing or attenuating it to a given fiber-optic channel. Both analog and digital states of the micro-mirror have been used for routing and attenuation. In analog mirror control, a micro-mirror sweeps through a continuous range of angles or translational positions. In digital micro-mirror operation, the micro-mirror has two distinct states such as +10 and −10 degree tilt states. Examples of such applications of the micro-mirror are described in L. Y. Lin, E. L. Goldstein, and R. W. Tkach, "Free-space micromachined optical switches with submillisecond switching time for large-scale optical crossconnects," *IEEE Photonics Technology Letters*, Vol. 10, No. 4, pp. 525–527, April 1998; J. E. Ford and J. A. Walker, "Dynamic spectral power equalization using micro-opto-mechanics," *IEEE Photonics Technology Letters*, Vol. 10, No. 10, pp. 1440–1442, October, 1998; J. E. Ford, J. A. Walker, V. Aksyuk, and D. J. Bishop, "Wavelength selectable add/drop with tilting micromirrors," IEEE LEOS Annual Mtg., IEEE, NJ., postdeadline paperPD2.3, November, 1997, N. A. Riza and S. Sumriddetchkajom, "Versatile multi-wavelength fiber-optic switch and attenuator structures using mirror manipulations," Optics Communications, Vol. 169, pp. 233–244, Oct. 1, 1999, P. Colboume et. al., "Variable optical attenuator," U.S. Pat. No. 5,915,063, Jun. 22, 1999, F. H. Levinson, "Optical coupling device utilizing a mirror and cantilevered arm," U.S. Pat. No. 4,626,066, Dec. 2, 1986, T. G. McDonald, "Using an asymmetric element to create a 1×N optical switch," U.S. Pat. No. 5,774,604, Jun. 30, 1998, and H. Laor, J. D' Entremont, E. Fontenot, M. Hudson, A. Richards, and D. Krozier, "Performance of a 576×576 Optical Crossconnect," pp. 276–281, National Fiber Optic Engineers Conf. Proceedings, Sept. 26–30, 1999.

All previous micro-mirror MEMS-based optical control structures have not exploited the 3-D beam control aspect to form the FO switches and attenuators. This is because a typical mirror provides 1-D and 2-D scans, without any focus/defocus controls. It is well known that freespace propagation of beams leads to beam spreading, eventually causing loss between the fiber input-output ports. Furthermore, when input to output path distances get large (e.g., >50 cm), slight vibrations or mechanical misalignments due to component finite tolerances or environmental conditions can cause partial loss of signal or even catastrophic failure. In particular, for the large (N×N where N>100) port count switch matrices, the input to output freespace distance are forced to be large (e.g., >50 cm), causing a high chance for switch failure. Today, there is no mechanism for providing tolerance to the mentioned failures in an optical switch matrix as the mirrors can intrinsically provide only 2-D tilt controls.

Another problem with the previously proposed analog drive MEMS-based modules is that they require the micromirror to deliver both coarse beam angular deflections and fine high resolution beam alignment, leading to requiring precise analog voltage control, adding to the cost of the component. Furthermore, it is well known that mechanically actuated optical mirrors perform well across a range of large angular motions (e.g., ±45 degrees), but suffer greatly for fine tweaking (e.g., <±0.5 degrees) due to inertia limits. In addition, the mechanics and electronics required for fine mirror control become large, power consuming, heavy, and expensive. On the other hand, electro-optic (EO) materials such as liquid crystals (LC's) can be used to form high resolution low power 3-D optical beam-formers using milliwatt level electrical power with small, lightweight and low cost designs. Such a 3-D EO beam-former was described in N. A. Riza and Shifu Yuan, "Demonstration of a liquid crystal adaptive alignment tweaker for high speed infrared band fiber-fed free-space systems," *Optical Engineering*, Vol. 37, No. 6, June, 1998. Also in G. D. Love, "Liquid Crystal Phase Modulator for unpolarized light," Applied Optics, pp. 2222–2223, Vol. 32, No. 13, May 1, 1993 and N. A. Riza and Shifu Yuan, "Robust Packaging of Photonic RF Modules using Ultra-Thin Adaptive Optical Interconnect Devices," SPIE Conf. on *Optical Technology for Microwave Applications VIII*, Vol. 3160, pp. 170–177, San Diego, August 1997, the NLC device is described in a reflective arrangement with a fixed mirror. Furthermore, G. D. Love proposes a setup for unpolarized light for astronomical image sharpening where typically the optical receiving apertures are very large (several meters diameter) telescopes implying that the adaptive optics is also large with very high (e.g., a million pixel) space bandwidth product processing.

The focus of this application is optical fiber-based polarized light control for small aperture (a millimeter or so diameter) 3-D beam-forming and spoiling to accomplish robust FO switching and attenuation. The optical beam control module invention in this patent application solves the coarse-fine control dilemma for FO attenuators and switches via the deployment of a dual 3-D beam-former cascade using both EO and MEMS technologies. The proposed module provides alignment tolerance, simplicity of control, and reduction of component failure probability, among other features required for a successful deployable module. The proposed invention is based on the 3-D beam spoiler concept as suggested by N. A. Riza in N. A. Riza and N. Madamopoulos, "Synchronous amplitude and time control for an optimum dynamic range variable photonic delay line," *Applied Optics*, Vol. 38, No. 11, pp. 2309–2318, Apr. 10, 1999. The proposed 3-D beam control module has both transmissive and reflective designs. In particular, the reflective design exploits the beam-forming capabilities of a mirror beam-former that is used to form the reflective architecture leading to a powerful dual cascade 3-D beam-former module.

In this invention, I use a module design employing a cascade of two 3-D optical beam-formers or spoilers. In the preferred embodiment, the EO 3-D beam-former is merged with a mirror such as a MEMS-based two axis mirror to form the desired 3-D optical beam-forming control module. This module becomes the required optical module for solving the problems associated with previous micro-mirror or liquid crystal (LC) based beam-formers. The invention uses this module to form failure and alignment tolerant switches and attenuators with built-in robustness that exploits the best features of both the optical MEMS and EO LC technologies, while suppressing or eliminating the weakness of each of the technologies. The optical MEMS-EO merger realizes a powerful 3-D optical beam control module.

SUMMARY OF THE INVENTION

The basic multi-technology platform MEMS-EO 3-D beam control module includes a MEMS two axis micro-mirror to provide the high speed coarse beam steering and a cascaded EO chip such as BM-NLC device to provide the finer high resolution 3-D beam-forming required for alignment and beam focus/defocus controls. The phase fronts stored in the EO device can generate further module flexibility such as multi-beam generation. The 3-D beam-former is used to solve the dilemma of port count related large fiber in-port to out-port distance versus component tolerances and environmental conditions that lead to FO module failure. The 3-D optical beam spoiler or optical beam-former concept can be used to manipulate the shape and direction of the beam exiting the module. For instance, by spoiling a beam in 3-D, a variable fiber-optical attenuator can be formed. Hence, the MEMS-EO module in its reflective implementation can be used to form a variable fiber-optic attenuator where the reflection process inherent in the module can lead to compact single and multi-beam attenuators. This 3-D beam spoiler concept can be extended to free-space routing systems such as in an N input –M output non-blocking FO switch matrix where the 3-D focus/defocus and fine tilt controls of the EO thin-film device such as an BM-NLC device forms the critical alignment control mechanisms in a complex maze of fiber ports. The basic MEMS-EO 3-D optical beam-former concept can be extended to an all-multipixel design where both the EO device and the MEMS device consists of independently driven elements. This extension of the MEMS-EO module to an all macropixel platform like the one in N. A. Riza and S. Sumriddetchkajom, "Digitally controlled fault-tolerant multiwavelength programmable fiber-optic attenuator using a two dimensional digital micro-mirror device," *Optics Letters*, Vol. 24, No. 5, pp. 282–284, Mar. 1, 1999, leads to a cascade of two 3-D beam-formers that form an overall module with a wide range of coarse-fine beam controls that can be useful in optimizing the size of large port count FO modules. The 3-D beam spoiler or controls concept can also be extended to a transmissive only design where both 3-D beam-formers are EO devices that couple to form a FO beam routing or attenuation module. Apart from NLCs, various other electronically controlled EO technologies can be used such as ferroelectric and polymer-dispersed LCs and piezo-ceramics and piezoelectrics like lead zirconate tantalate (PLZT).

DETAILED DESCRIPTION OF THE INVENTION

Figure 1A:
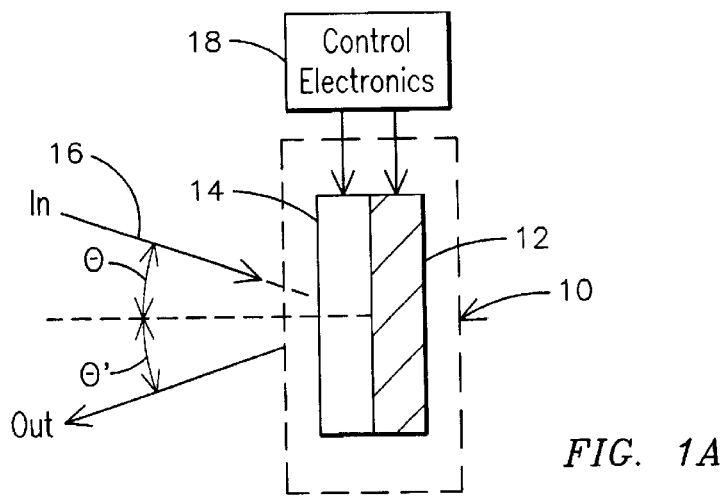
FIG. 1a illustrates a 3-D beam control module using a multi-technology MEMS-EO platform using a two axis micro-mirror cascaded with an EO 3-D beam-former.

FIG. 1a illustrates a basic 3-D beam spoiling or beam-forming module 10 for light beam control using a multi-technology platform of two beam control technologies, namely, optical MEMS micro-mirror 12 and EO 3-D beam-former element 14. The 3-D multi-technology approach eliminates or suppresses the limitations in each of the technologies while exercises the superior capabilities of all technologies, leading to a failure robust alignment controlled beam control module that can be used for realizing a host of commercially valuable components and products, especially in the FO industry.

The module 10 relies on a reflective architecture involving two independent beam-formers 12, 14. Beam-former 12 is a two axis mirror that is intrinsically reflective and low loss. The mechanical motion of this micro-mirror is used for coarse beam steering of an input unknown polarization beam coming from a port such as a FO collimating lens coupled to a FO cable. The mirror basically steers the beam in 1-D or 2-D, for tilt controls. A typical MEMS-based two axis scanner that can be employed in the invention has been described in M. D. Johnson, N. G. Loebel, M. L. Gitlin, and N. F. Paradise, "Two axis micro-mirror scanner," SPIE Conf. On Optical Scanning: Design & Application, Vol. 3787, pp. 89–95, July 1999. The EO beam-former acts as a programmable glass lens and/or a tilting wedge to cause fine 3-D beam controls. Hence, using the reflective design, the MEMS and EO devices come into play, forming a wide range high resolution 3-D beam-former or beam spoiler. All the optical elements are planar elements that are cascaded together tightly to form one robust module. Typically, all elements are thin (<1 mm) plates. Light 16 is incident at some angle θ and is reflected back at another angle θ'. This angle θ' is determined by two key factors, i.e., (a) two axis tilt setting of the mirror 12 and (b) the optical phase perturbation programmed on the EO spatial light modulator (SLM) 14. It is important to note that any combination of beam-formers can be used to implement 3-D beam-forming, including using just one of the beam-formers. The EO and MEMS mirror are controlled by conventional control electronics 18 of a type well known in the art.

Figure 1B:
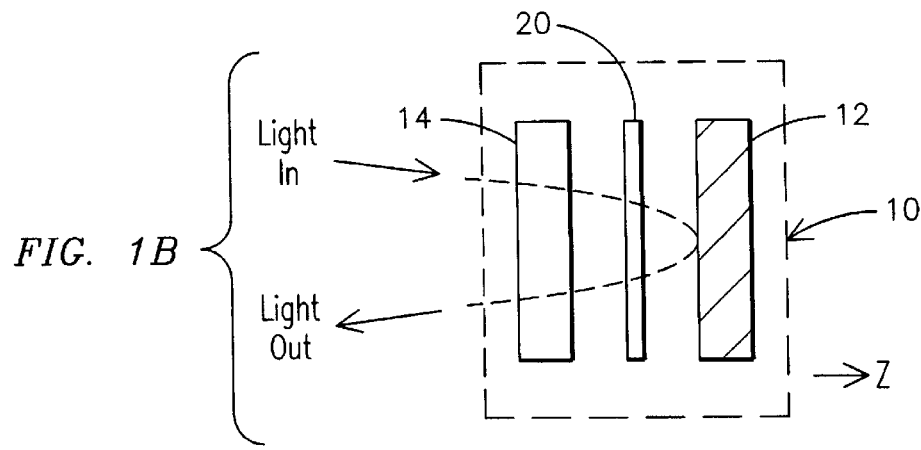
FIG. 1b is an example of a 3-D control module using a 2-D pixelated birefringence-mode nematic liquid crystal (BM-NLC) 3-D beam-former device coupled with a two axis micro-mirror on a z-axis translational platform or a multi-mirror device with 3-D beam-forming capabilities.

FIG. 1b shows one implementation of the MEMS-EO module 10 using a NLC SLM. Here polarized light of any polarization enters the module 10 and passes through the first EO SLM 14 that is a 2-D multi-pixel birefringent-mode (BM-NLC) device with its nematic director pointing along the s or vertical direction. Input polarized light can be considered as being made up of a "s" or vertical polarization component and a "p" or horizontal polarization component, with a relative phase shift between the two components. On the first pass through the NLC device, the s-polarization sees the programmed phase front. After double pass through a quarter-wave plate 20 (QWP) and reflection from the mirror 12, the incident s-polarization becomes a p-polarization and passes without seeing the NLC device phasefront again. This way, the incident s-polarization beam undergoes 3-D beam-forming controlled by the NLC device. Similarly, the incident p-polarization undergoes beam control, except in this case, it sees the phasefront after reflection from the mirror. Thus, by programming the NLC device 14, an incident polarized beam can undergo 3-D control. Note that the mirror 12 also simultaneously changes its 2-axis tilts, implying that both θ and angle θ' can be adjusted and the incident beam can undergo both wide and small angular scans. The mirror 12 can also be kept static or in one fixed position if wide scans are not required. Note that the NLC device 14 also plays the vital role of focus/defocus and tweaker for assuring accurate beam alignment, especially to coupling fiber-optics. The two axis single element mirror 12 can be replaced by one multi-mirror device such as a piston-motion micro-mirror SLM that can perform powerful 3-D beam-forming. The control electronics 18 is not shown in this FIG. but would be the same as shown in FIG. 1a.

Figure 1C:
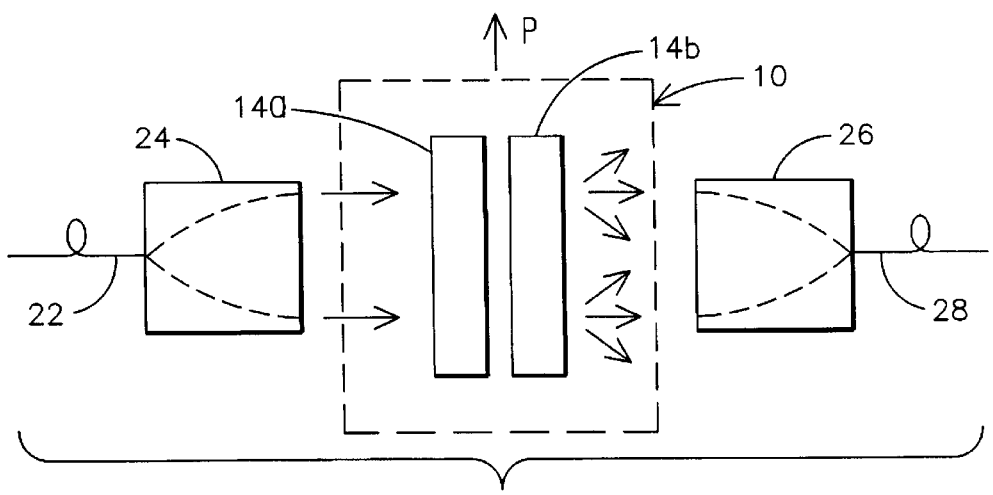
FIG. 1c illustrates a fiber-optic application transmissive version of the module of FIG. 1a using two cascaded 3-D EO beam-formers employing two 2-D pixelated BM-NLC devices.

Another embodiment of the MEMS-EO module 10 is the transmissive architecture shown in FIG. 1(c) for a FO connection where two NLC-based 3-D beam-formers 14a and 14b are used without the reflective mirror 12. Here, the nematic directors for the two NLC devices 14a, 14b are orthogonal in order to process light for both horizontal and vertical polarization components. The light enters via optical fiber 22 through GRIN lens 24 and exits thorough GRIN lens 26 into optical fiber 28.

Figure 2A:
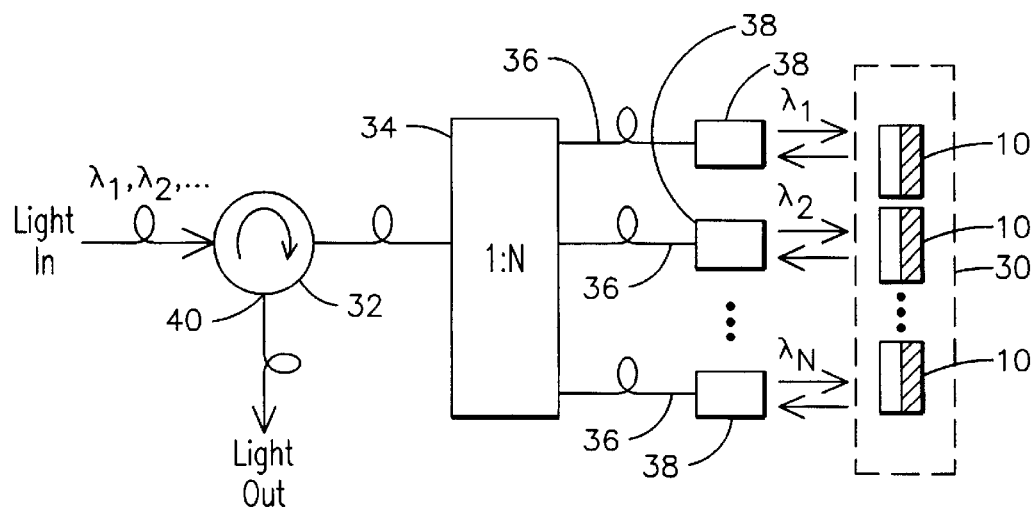
FIG. 2a shows a MEMS-EO 3-D beam control module-based fiber-optic attenuator module in a multiwavelength attenuator design.

FIG. 2a shows a plurality of MEMS-EO modules 10 used to form a multiwavelength fiber-optic variable attenuator structure 30 such as used in optical amplifier equalizers. Multiwavelength light enters via a circulator 32 and passes to a 1:N wavelength multiplexer 34 that spatially separates the wavelengths into their respective optical fibers 36. Light exits from each fiber through lens 38 and strikes the respective 3-D MEMS-EO module 10. The 3-D module acts as a beam spoiler to cause a reflected light spatial mismatch at the fiber-lens 36–38 return path. For maximum coupling, the light returning to the fiber 36 must be collimated with an appropriate divergence angle. If this condition is gradually perturbed by changing tilt, translation and focus/defocus of the returning beam, as originally described by N. A. Riza and S. Yuan, "General formula for coupling-loss characterization of single-mode fiber collimators by use of gradient index rod lenses," Applied Optics, Vol. 38, No. 15, pp. 3214–3222, May 20, 1999, a variable coupling can be implemented leading to a high performance fiber-optic attenuator. Typically, a greater than 0.5 degree tilt misalignment causes a 50 dB loss of optical signal coupling. The 3-D MEMS-EO module 10 allows the required precise beam spoiling to realize a high resolution variable optical attenuator. The attenuated light after retroreflection returns via the same hardware and exits through the circulator 32 port 40.

Figure 2B:
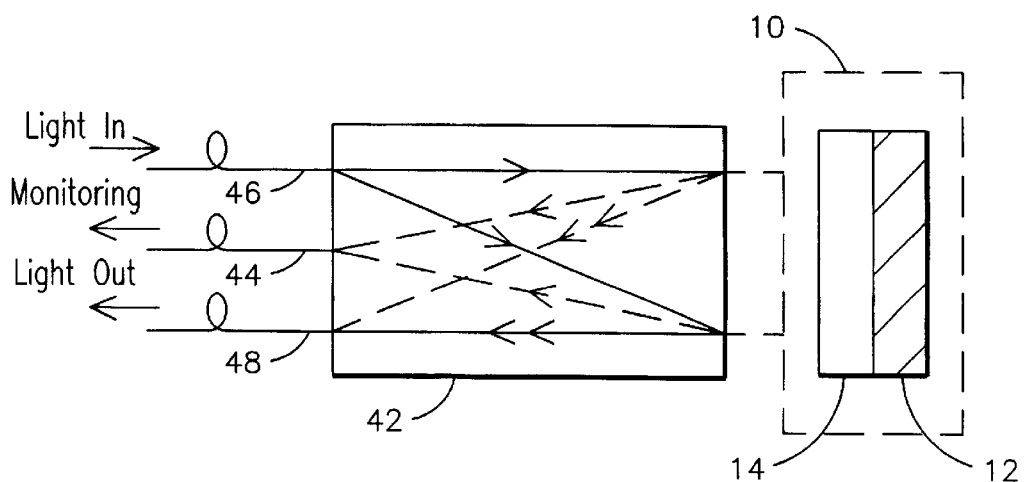
FIG. 2b shows a MEMS-EO 3-D beam control module-based fiber-optic attenuator module in a single beam attenuator design with two output ports, one for monitoring and one for light output.

FIG. 2b shows a similar attenuator although for a single input beam. This embodiment forms a 1×2 FO structure using a single fiber lens 42, saving valuable space and realizing an ultracompact unit. The design uses an off-axis fiber lens geometry where the single fiber lens 42 forms the input and output fiber coupling optics. In particular, the fiber lens central axis forms the location of the monitoring port fiber 44 while the two off-axis fiber lens positions form the locations for the input and output fibers 46, 48. Again, the 3-D MEMS-EO module 10 forms the required beam spoiler, directing the appropriate amount of light to the two output ports. Note that the MEMS mirror has three options, (a) multi-mirror digital tilt mirror device or multimirror analog piston-type mirror device, (b) Fixed mirror, or (c) One x-y-z scan micro-mirror. The design in FIG. 2(b) also leads to a variable continuously programmable 1×2 coupler or a digital 1×2 FO switch. The MEMS mirror 12 can direct all the light to the monitoring fiber 44 or to the output fiber 48 when acting as a switch or can divide the light between the monitoring and output ports in any ratio when acting as an attenuator.

Figure 3A:
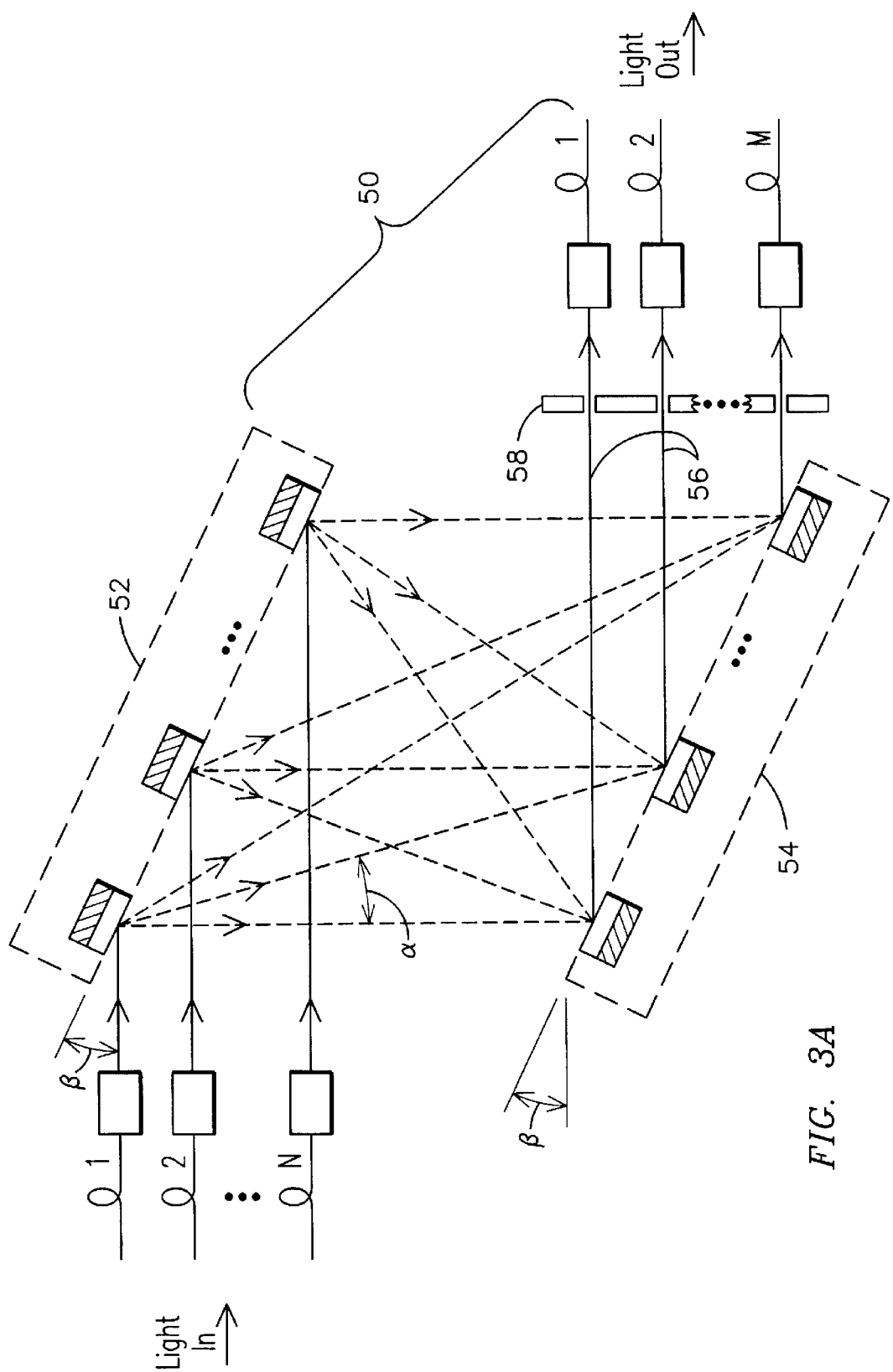
FIG. 3a shows a MEMS-EO 3-D beam control module based N×M freespace interconnection fiber-optical switch matrix.

FIG. 3a shows the 3-D MEMS-EO module used to realize a N×M fiber-optic switch matrix 50. Here a total of N+M 3-D modules 10 are required to form the non-blocking interconnections through free-space or solid-optic glass (not shown). Each fiber-to-fiber optical link operates using a 3-D module pair of beam-former arrays 52 and 54. Each 3-D module in the array 52 can route light to any other 3-D module 10 in array 54 that realigns the light to enter the selected one of the output fiber ports 56(1–M). Spatial filters 58 can be added to the structure to reduce crosstalk, as shown. N 3-D modules 10 can be fabricated on a single substrate to reduce fabrication costs. This design realizes an N×M design, where in this case the second (or lower) beam director has M 3-D modules that redirect light to M output fiber ports and M can be the same or different than N. Attenuation control on a per beam level is also possible by exploiting the beam spoiling feature of each 3-D MEMS-EO module.

Figure 3B:
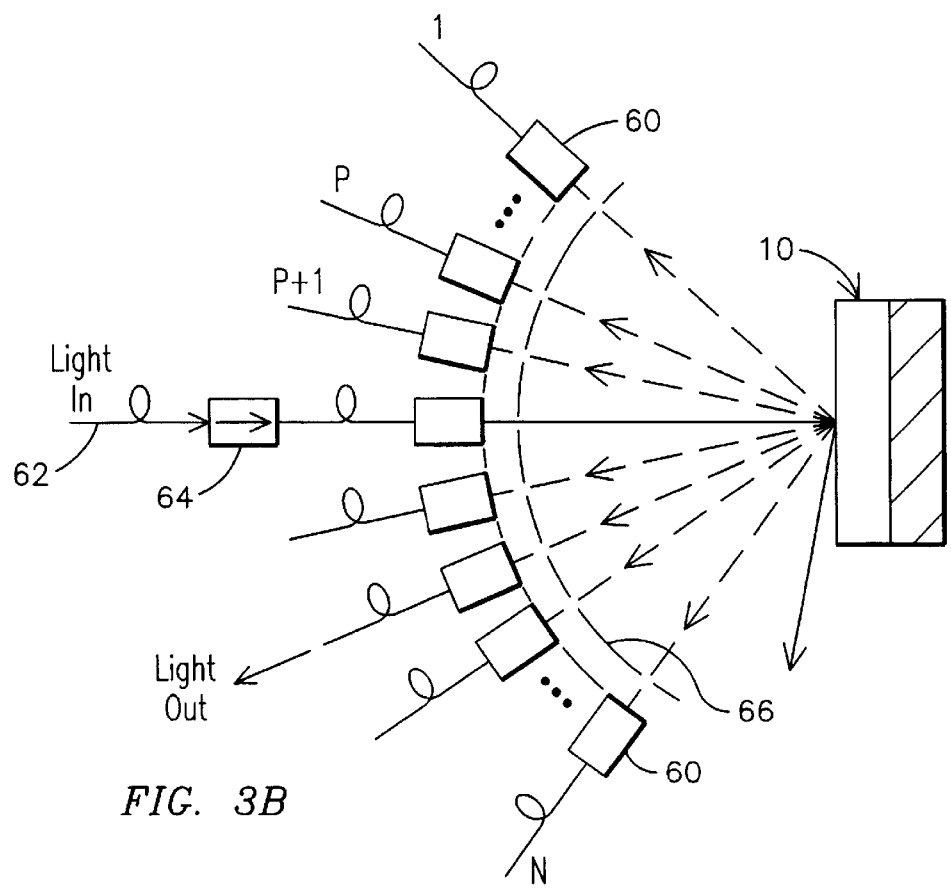
FIG. 3b shows a 1×N free-space fiber-optical switch.
Figure 3C:
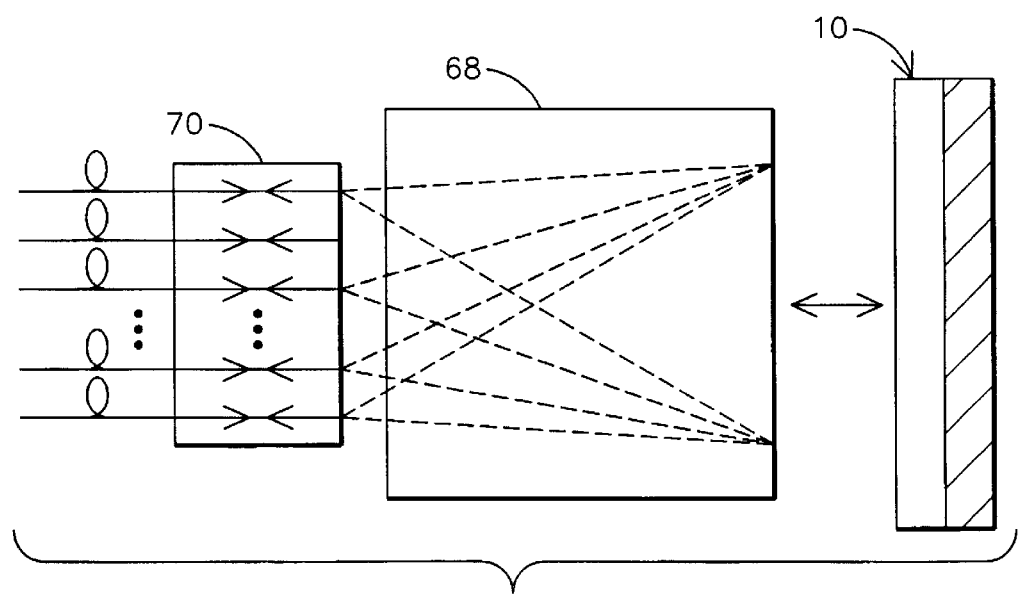
FIG. 3c shows a single fiber-lens-based 1×N fiber-optical switch.

FIG. 3b shows a 1×N FO switch design using a single 3-D MEMS-EO module 10. Here, the fiber ports 60 are arranged in a circular geometry to induce equal path lengths. The input light path 62 has an isolator 64 to prevent retroreflected energy from returning. A spatial filter 66 can also be used in this structure to reduce crosstalk. FIG. 3c shows an ultra-compact version of the FIG. 3b embodiment. Here, a single fiber lens 68 coupled with a linear placement multi-fiber V-groove chip 70 does the required coupling to form a 1×N switch structure, in a similar light to the design in FIG. 2(b). Note that it is also possible to have simultaneous beams broadcast to various selected fiber ports by controlling the 3-D beam-forming implemented by the 3-D MEMS-EO module.

All the modules and applications described in this application are reversible with ports inter-changeable. Also, although the figures are drawn in 1-D, the modules and architectures can be implemented in a 2-D format as the proposed 3-D modules provide light beam control in 3-D, i.e., x, y and focus. Also note that not all parts inside the 3-D module need to be used and the choice of which beam-former is active or used depends on the application.

What is claimed is:

1. An optical beam-forming module comprising:

a micro-electromechanical systems device for macro deflection of an impinging light beam;

an electro-optic device mounted adjacent said micro-electromechanical systems device whereby said light beam passes through said electro-optic device both when approaching said micro-electromechanical systems device and when reflected therefrom, said light beam being polarized and said electro-optic device comprising 2-D multipixel, bi-refringement mode, nematic liquid crystal device;

an overlaying quarter wavelength plate between said electro-optic device and said micro-electromechanical systems device; and control means coupled to each of said micro-electromechanical systems devices and said electro-optic devices for controlling the reflection angle of the light beam.

2. An optical beam control system comprising:

a first micro-electromechanical systems (MEMS) device positioned in a first optical beam path and operable to reflect light impinging thereon into a second optical beam path;

a controllable spatial light modulator (SLM) positioned adjacent said MEMS device and intersecting each of said first and second optical beam paths; and an electronic controller coupled to each of said MEMS device and said SLM, said controller being operative to establish a first angle of reflection of light from said first beam path towards said second beam path by adjustment of a reflection angle of said MEMS device, said controller being operative to establish a second angle of light reflected by said MEMS device by electronic adjustment of the optical phase perturbation of the reflected light in said SLM.

3. The optical beam control system of claim 2 and including a graded index (GRIN) lens positioned in said optical beam paths, said GRIN lens having an off-central axis for directing incoming and reflected light into multiple beam paths.

4. The optical beam control system of claim 2 and including:

an optical circulator having at least first, second and third light ports, a first light port being connected for receiving an incoming light beam;

a 1×N optical wavelength multiplexer having a first broadband I/O port for receiving a light beam and N plurality of narrow band I/O ports, said multiplexer being bidirectional for separating said light beam at said first I/O port into multiple narrow bandwidth light beams at said N I/O ports and for combining narrow bandwidth light beams at said N I/O ports into a broadband light beam at said first I/O port, said first I/O port being coupled to a second light port of said circulators; and a plurality of MEMS devices each associated with a respective one of said N I/O ports of said multiplexer, said MEMS devices being controllable to adjust each reflected narrow bandwidth light beam in a controlled amount.

5. The optical beam.control system of claim 2 wherein said spatial light modulator comprises an additional MEMS device having micromirrors oriented to deflect said light beam at a different angle than said first MEMS device.

* * * * *